United States Patent
Shen et al.

(10) Patent No.: US 8,027,157 B2
(45) Date of Patent: Sep. 27, 2011

(54) BATTERY COVER LATCH MECHANISM AND PORTABLE ELECTRONIC DEVICE USING SAME

(75) Inventors: Zhi-Yun Shen, Shenzhen (CN); Zhi Li, Shenzhen (CN); Zheng Shi, Shenzhen (CN); Chih-Chiang Chang, Taipei Hsien (TW)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 585 days.

(21) Appl. No.: 12/254,095

(22) Filed: Oct. 20, 2008

(65) Prior Publication Data

US 2009/0239140 A1    Sep. 24, 2009

(30) Foreign Application Priority Data

Mar. 21, 2008   (CN) .......................... 2008 1 0300653

(51) Int. Cl.
  *G06F 1/16* (2006.01)
  *H01M 2/10* (2006.01)
  *H04M 1/00* (2006.01)
(52) U.S. Cl. ................... 361/679.58; 429/97; 455/575.1
(58) Field of Classification Search .......... 361/679.01–679.45, 679.55–679.59; 429/97, 100; 455/575.1, 575.8
See application file for complete search history.

(56) References Cited

U.S. PATENT DOCUMENTS

| | | | | |
|---|---|---|---|---|
| 5,607,792 A * | 3/1997 | Garcia et al. | ..................... | 429/97 |
| 6,136,467 A * | 10/2000 | Phelps, III et al. | .............. | 429/97 |
| 6,623,049 B2 * | 9/2003 | Shreeve et al. | ................... | 292/19 |
| 6,625,425 B1 * | 9/2003 | Hughes et al. | ............... | 455/90.3 |
| 7,412,268 B2 * | 8/2008 | Jung | .......................... | 455/575.1 |
| 7,419,742 B2 * | 9/2008 | Liu et al. | .......................... | 429/97 |
| 7,842,412 B2 * | 11/2010 | Zhang et al. | .................... | 429/97 |
| 2006/0281501 A1 * | 12/2006 | Zuo et al. | ................... | 455/575.1 |
| 2006/0292439 A1 * | 12/2006 | Zuo et al. | ........................ | 429/97 |

FOREIGN PATENT DOCUMENTS

CN      1520128 A      8/2004
CN      101127390 A    2/2008

* cited by examiner

*Primary Examiner* — Jayprakash N Gandhi
*Assistant Examiner* — Nidhi Desai
(74) *Attorney, Agent, or Firm* — Altis Law Group, Inc.

(57) ABSTRACT

A battery cover latch mechanism (10) used in portable electronic device (100) is described including a cover member (11), a housing member (12), a latch assembly (13), and a return member (14). The latch assembly slides from a released position to a latched position to latch the cover member to the housing member. The return member is secured to the cover member including an elastic sheet (141) secured to the latch assembly. The elastic sheet is used to return the latch assembly from the latched position to the released position.

10 Claims, 5 Drawing Sheets

BATTERY COVER LATCH MECHANISM AND PORTABLE ELECTRONIC DEVICE USING SAME

BACKGROUND

1. Field of the Invention

The invention relates to battery cover latch mechanisms used in portable electronic devices.

2. Description of related art

Portable electronic devices usually include latch mechanisms used to latch battery covers to housings. The latch mechanisms must tolerate frequent installation and removal of batteries relative to the housings.

A typical battery cover latch mechanism includes at least one spring to facilitate the operation thereof. However, the spring may easily wear out after repeated operation and, thus the battery cover latch mechanism may fail.

Therefore, there is room for improvement within the art.

BRIEF DESCRIPTION OF THE DRAWINGS

Many aspects of the exemplary battery cover latch mechanism and a portable electronic device using the battery cover latch mechanism can be better understood with reference to the following drawings. These drawings are not necessarily drawn to scale, the emphasis instead being placed upon clearly illustrating the principles of the exemplary battery cover latch mechanism and the portable electronic device. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
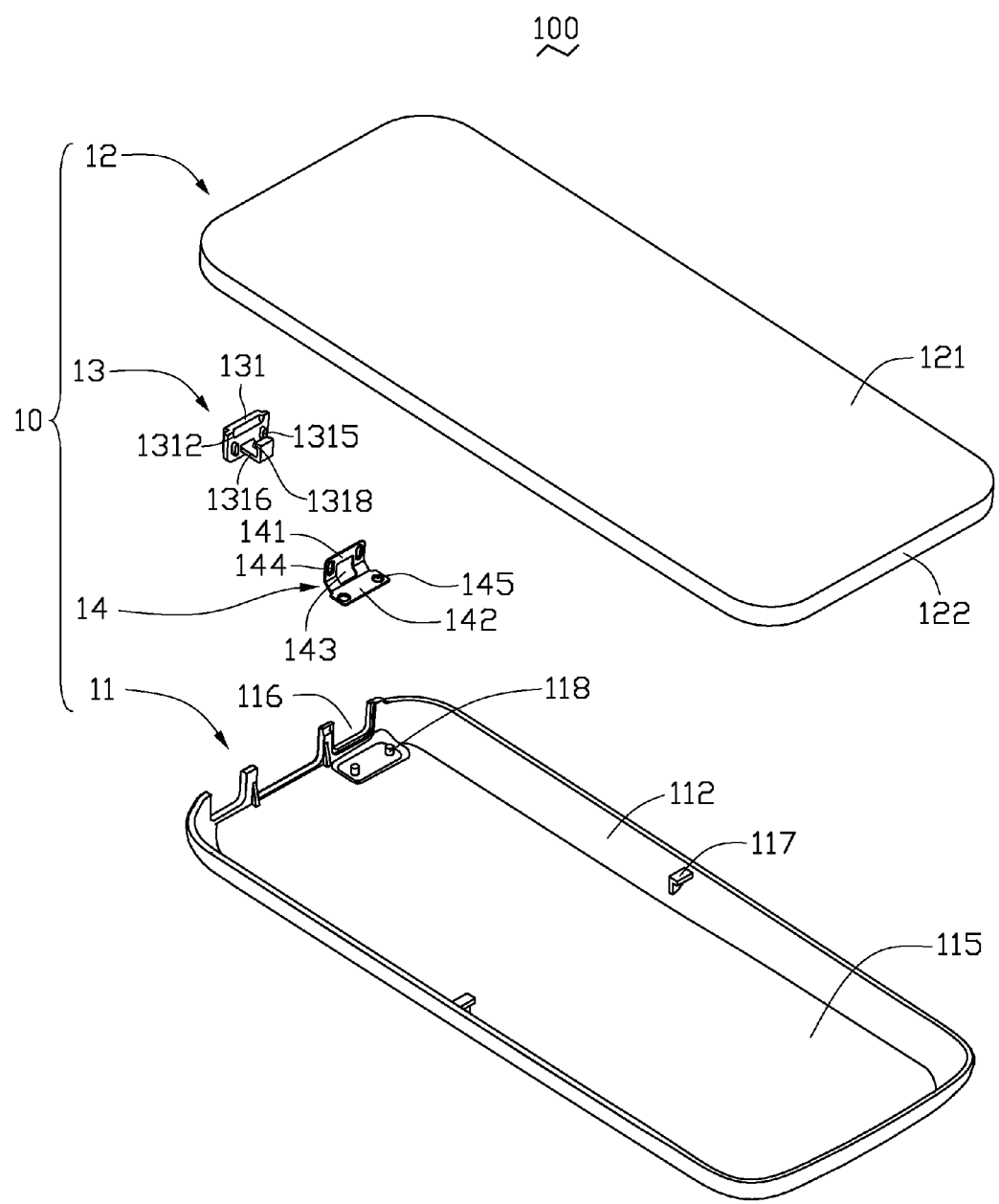
FIG. 1 is an exploded, isometric view of a portable electronic device incorporating a battery cover latch mechanism according to the exemplary embodiment.
Figure 2:
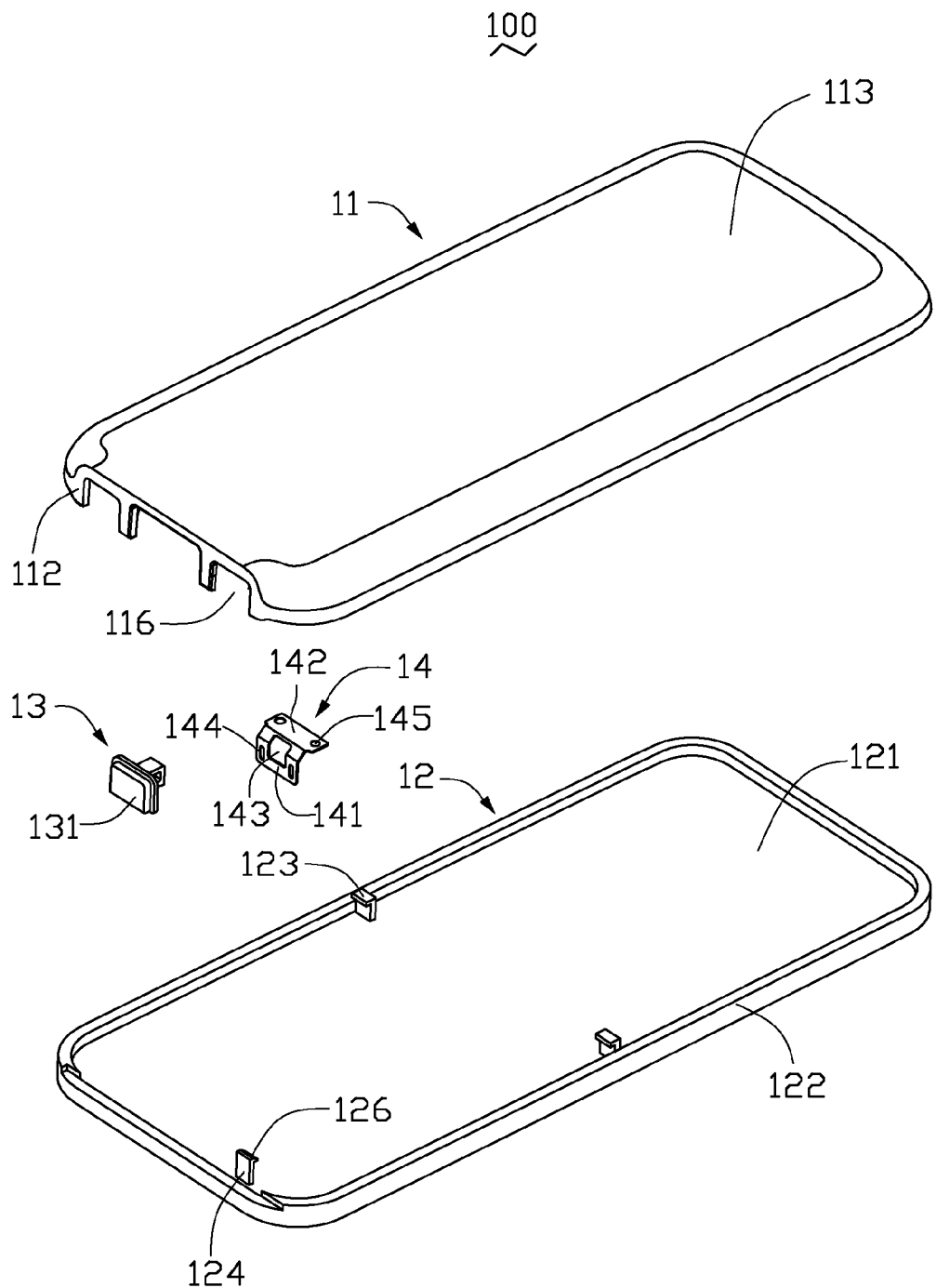
FIG. 2 is similar to FIG. 1 viewed from another angle.

FIGS. 1 and 2 show a portable electronic device 100 including a battery cover latch mechanism 10 including a cover member 11, a housing member 12, a latch assembly 13, and a return member 14. The housing member 11 can be a housing of the portable electronic device 100. The cover member 12 can be a cover of the portable electronic device 100. The latch assembly 13 is configured to be mounted between the housing member 11 and the cover member 12 for latching the cover member 12 to the housing member 11. The return member 14 is used to facilitate the latching of the latching member 13.

The cover member 11 has a first peripheral wall 112, a bottom wall 113 (shown in FIG. 2), and a battery chamber 115. The first peripheral wall 112 surrounds the battery chamber 115. The battery chamber 115 can accommodate a battery (not shown). One end of first peripheral wall 112 defines a generally rectangular notch 116. The first peripheral wall 112 also forms two generally L-shaped first retaining blocks 117. The two first retaining blocks 117 extend towards the center of the battery chamber 115. The bottom wall 113 has two mounting columns 118 formed thereon and near the notch 116.

Figure 3:
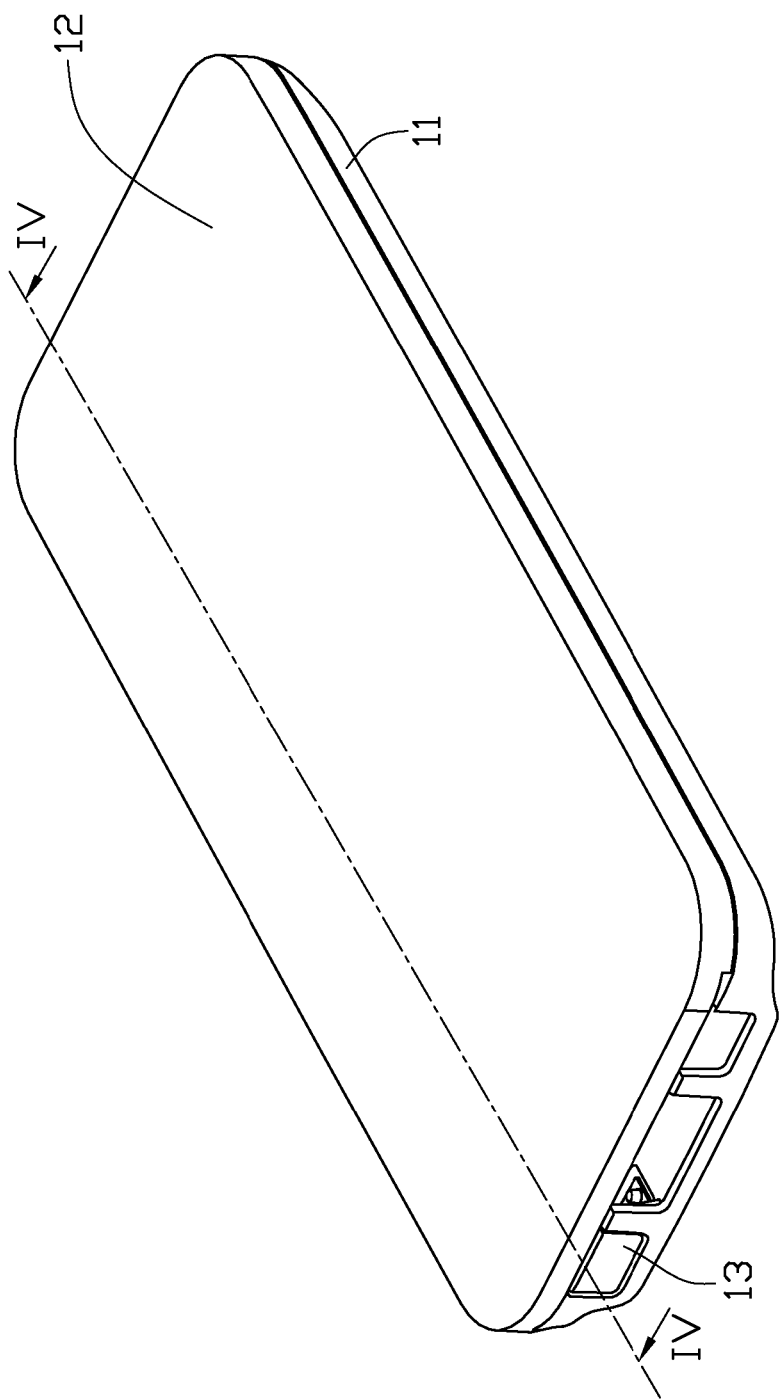
FIG. 3 is an isometric view of the battery cover latch mechanism at a latched position.

The housing member 12 includes a second peripheral wall 122 and an upper wall 121. The second peripheral wall 122 is configured to mate with the first peripheral wall 112 (best shown in FIG. 3). Referring also to FIG. 2, one end of the upper wall 121 forms a generally L-shaped claw 124 near the second peripheral wall 122. The claw 124 has a first inclined wall 126 at a distal end of the upper wall 121. The upper wall 121 also forms two generally L-shaped second retaining blocks 123. The two second retaining blocks 123 extend towards the center of upper wall 121. The second retaining blocks 123 correspond to the first retaining blocks 117 and are configured to interlock with the first retaining blocks 117 (best shown in FIG. 4).

The latch assembly 13 includes a stepped pressing portion 131 with a generally L-shaped protrusion and two generally cylindrical protrusions. The L-shaped protrusion is defined by a claw portion 1316. The two generally cylindrical protrusions are two securing portions 1315. The claw portion 1316 and the two securing portions 1315 protrude from the same surface of the pressing portion 131. The claw portion 1316 is disposed between the two securing portions 1315.

Figure 4:
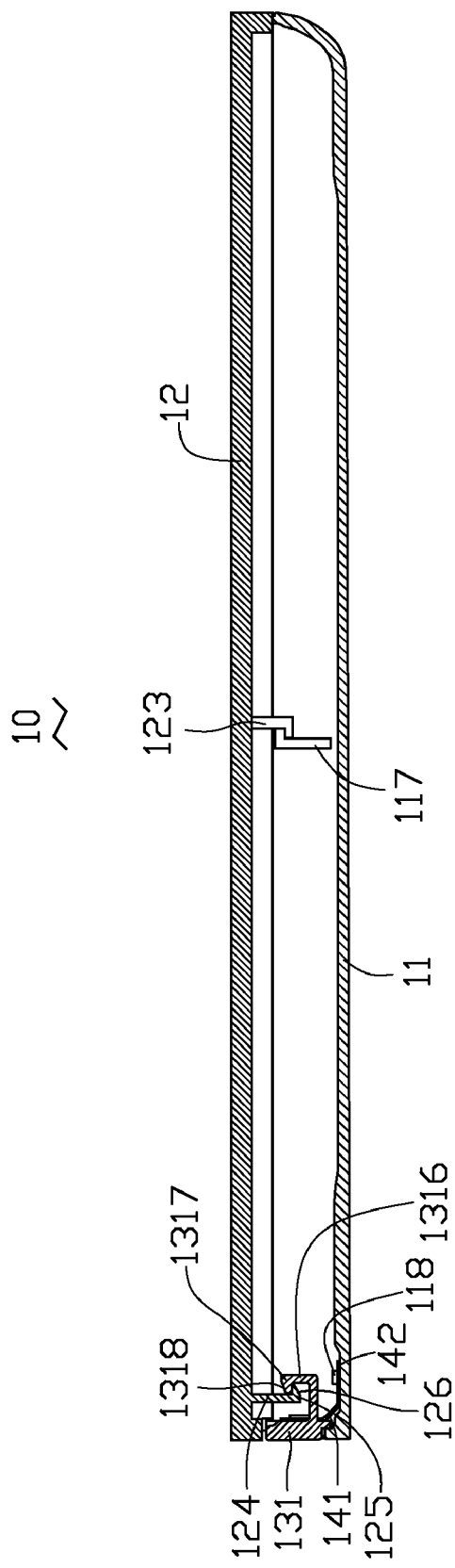
FIG. 4 is a sectional view of the battery cover latch mechanism shown in FIG. 4.
Figure 5:
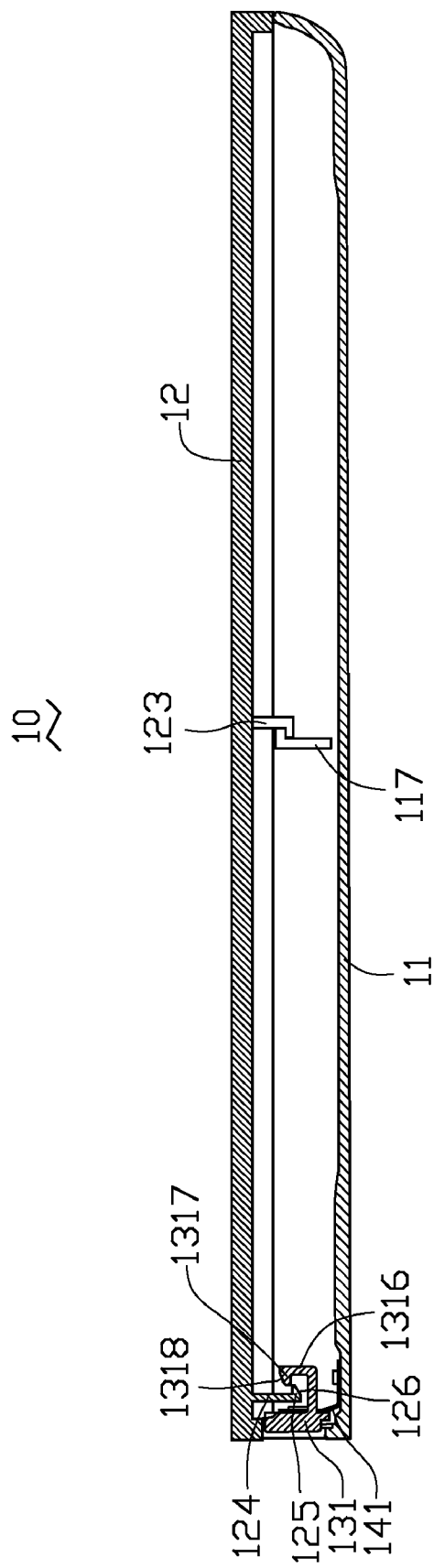
FIG. 5 is similar to FIG. 4 but showing a released position.

Referring also to FIGS. 4 and 5, the pressing portion 131 is configured to be received in the notch 116 and slide within the notch 116. Two step parts 1312 of the pressing portion 131 are used to prevent the pressing portion 131 from falling out of the notch 116. The latch assembly 13 further can be secured within notch 116 by securing the securing portions 1315 to the return member 14 and the cover member 11. The claw portion 1316 corresponds to the claw 124 and configured to interlock with the claw 124. The claw portion 1316 has a second inclined wall 1318 corresponding to the first inclined wall 126. The second inclined wall 1318 is located distal to the pressing portion 131.

The return member 14 includes a mounting portion 142 connected to an elastic sheet 141. The mounting portion 142 defines mounting holes 145 corresponding to the mounting columns 118. The mounting portion 142 can be secured to the bottom wall 113 by e.g., hot melting of the mounting columns 118 within the mounting holes 145. The elastic sheet 141 is generally formed as a bent sheet that can be elastically deformed at the bend. Also, the whole elastic sheet 141 can be elastically deformed relative to the mounting portion 142. The elastic sheet 141 defines a central hole 143 and two securing holes 144. The central hole 143 is positioned between the two securing holes 144. The securing holes 144 correspond to the securing portions 1315. The securing portions 1315 are configured to engage through the securing holes 14 so the latch assembly 13 can be secured to the return member 14.

Referring to FIG. 4, the battery cover latch mechanism 10 is in a latched position. The cover member 11 is latched to the housing member 12 by the interlocking of the claw 124 and the claw portion 1316 as well as the interlock between the first retains blocks 117 and the second retaining blocks 123. The claw portion 1316 passes through the central hole 143 of the elastic sheet 141. The elastic sheet 141 is elastically deformed to resist movement of the pressing portion 131 further into the notch 116. Oppositely, the pressing portion 131 is secured within the notch 116 by the biasing of the interior surface of the first peripheral wall 112 against the step parts 1312.

Referring further to FIG. 5, when the cover member 11 needs to be released from the housing member 12, the pressing portion 131 is pressed further into the notch 116. This action moves the claw portion 1316 away from the claw 124 until the interlocking of the claw portion 1316 and claw 124 is released. The elastic sheet 141 is continuously further deformed. As the interlocking is released, the first inclined wall 126 jumps to the second inclined wall 1318. At this time, by removing the pressing force, the pressing portion 131 and the claw portion 1316 move back to their released positions by the elastic force of the elastic sheet 141. Simultaneously, the second inclined wall 1318 moves along the first inclined wall 126, thus raising the claw 124 and the housing member 12 upwardly from the cover member 11. Then, the cover member 11 can be pushed apart from the housing member 12. The interlocking of the first retaining blocks 117 and the second retaining blocks 123 is released as the cover member is pushed apart from the housing member.

Concerning the latching of the cover member 11 to the housing member 12, the principle is similar to the above releasing process, but in reverse.

It is to be understood, however, that even through numerous characteristics and advantages of the exemplary invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A battery cover latch mechanism, comprising: a cover member; a housing member; a latch assembly positioned between the cover member and the housing member and, configured for sliding between a released position and a latched position; a return member secured to the cover member, comprising an elastic sheet secured to the latch assembly, the elastic sheet configured for biasing the latch assembly towards the latched position; wherein the latch assembly comprises a claw portion, and the housing member comprises a claw, the claw portion configured for interlocking with the claw; wherein the elastic sheet defines a central hole, and the claw portion passes through the central hole to interlock with the claw; wherein: the claw comprises a first inclined wall; the claw portion comprises a second inclined wall engaging with the first inclined wall; and the first inclined wall moving along the second inclined wall to drive the latch assembly to slide; and deform the elastic sheet relative to the cover member; and wherein the latch assembly further comprises a pressing portion; the cover member comprises a peripheral wall defining a notch; and the pressing portion is positioned in the notch and can slide within the notch.

2. The battery cover latch mechanism as claimed in claim 1, wherein the cover member comprises two first retaining blocks, the housing comprises two second retaining blocks, the second retaining blocks are configured for interlocking with the first retaining blocks.

3. The battery cover latch mechanism as claimed in claim 1, wherein the return member further comprises a mounting portion, the mounting portion secured to the cover member, and the elastic sheet is deformable relative to the mounting portion.

4. The battery cover latch mechanism as claimed in claim 3, wherein the mounting portion comprises a mounting hole, the cover member comprises a mounting column secured within the mounting hole.

5. The battery cover latch mechanism as claimed in claim 4, wherein the elastic sheet defines a securing hole, the latch assembly forms a securing portion, and the securing portion is a secured within the securing hole.

6. A portable electronic device, comprising: a cover; a housing; a battery cover latch mechanism comprising: a latch assembly positioned between the cover and the housing and, configured for sliding between a released position and a latched position; a return member secured to the cover, comprising an elastic sheet secured to the latch assembly, the elastic sheet configured for biasing the latch assembly towards the latched position; wherein the latch assembly comprises a claw portion, and the housing member comprises a claw, the claw portion configured for interlocking with the claw; wherein the elastic sheet defines a central hole, and the claw portion passes through the central hole to interlock with the claw; wherein the claw comprises a first inclined wall; the claw portion comprises a second inclined wall engaging with the first inclined wall; and the first inclined wall moving along the second inclined wall to drive the latch assembly to slide and deform the elastic sheet relative to the cover; and wherein the latch assembly further comprises a pressing portion; the cover comprises a peripheral wall defining a notch; and the pressing portion is positioned in the notch and can slide within the notch.

7. The portable electronic device as claimed in claim 6, wherein the cover comprises two first retaining blocks, the house comprises two second retaining blocks, the second retaining blocks are configured for interlocking with the first retaining blocks.

8. The portable electronic device as claimed in claim 6, wherein the return member further comprises a mounting portion, the mounting portion secured to the cover, and the elastic sheet is deformable relative to the mounting portion.

9. The portable electronic device as claimed in claim 8, wherein the mounting portion comprises a mounting hole, the cover comprises a mounting column secured within the mounting hole.

10. The portable electronic device as claimed in claim 9, wherein the elastic sheet defines a securing hole, the latch assembly forms a securing portion, and the securing portion is secured within the securing hole.

* * * * *